United States Patent [19]

Tulet

[11] Patent Number: 5,585,633
[45] Date of Patent: Dec. 17, 1996

[54] TERRESTRIAL SENSOR DEVICE FOR SATELLITE OR THE LIKE

[75] Inventor: Michel Tulet, Balma, France

[73] Assignee: Matra Marconi Space France, Paris, France

[21] Appl. No.: 514,920

[22] Filed: Aug. 14, 1995

[30] Foreign Application Priority Data

Aug. 16, 1994 [FR] France .................................. 94 10045

[51] Int. Cl.$^6$ ................................................ G01J 5/02
[52] U.S. Cl. ...................................... 250/338.3; 250/349
[58] Field of Search ............................... 250/338.3, 332, 250/349

[56] References Cited

U.S. PATENT DOCUMENTS

| | | |
|---|---|---|
| 4,072,863 | 2/1978 | Roundy . |
| 4,191,967 | 3/1980 | Dansac et al. . |
| 5,055,689 | 10/1991 | Proffit et al. . |

FOREIGN PATENT DOCUMENTS

| | | |
|---|---|---|
| 0083240 | 7/1983 | European Pat. Off. . |
| 0349027 | 1/1990 | European Pat. Off. . |
| 0496568 | 7/1992 | European Pat. Off. . |
| 2555312 | 5/1985 | France .................................. 250/349 |

OTHER PUBLICATIONS

NEC Research and Development, No. 97, Apr. '90 Tokyo, Japan, pp. 35–41, XP 000149045 Fumiho Takahashi et al "Development of Precision Earth Sensor for ETS–VI Satellite"–p. 35, left column, line 15–p. 38, right column, line 20, Figs. 1–3. no date.

*Primary Examiner*—Carolyn E. Fields
*Assistant Examiner*—Edward J. Glick
*Attorney, Agent, or Firm*—Larson and Taylor

[57] ABSTRACT

The terrestrial sensor device is suitable for use on a satellite or spacecraft. It has a lens for forming an image of the Earth in a focal plane, and a sensor placed in the focal plane. The sensor is constituted by a two-dimensional array of pyroelectric detectors. The device also includes an actuator for oscillating the array in the focal plane, orthogonally to the optical axis of the image-formation lens, at a determined frequency and with an amplitude at least equal to the distribution spacing of the detectors and a processing circuit for acquisition of the output signals of the detectors at the oscillation frequency and for comparison of the output signals with a threshold.

10 Claims, 1 Drawing Sheet

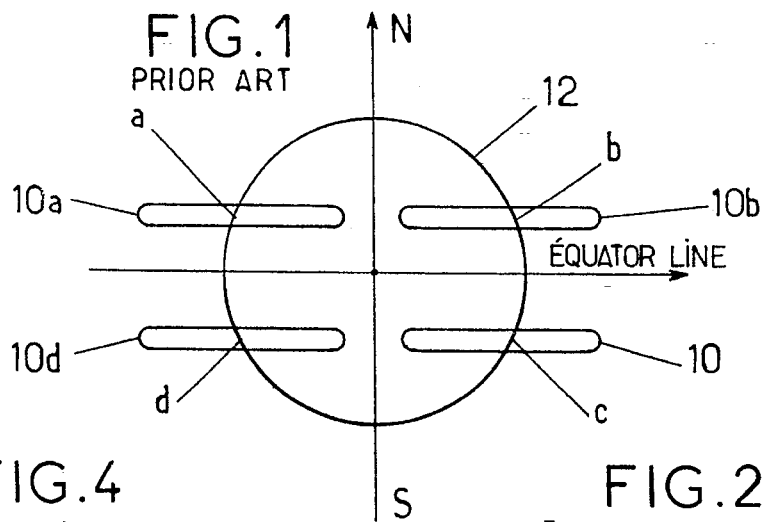
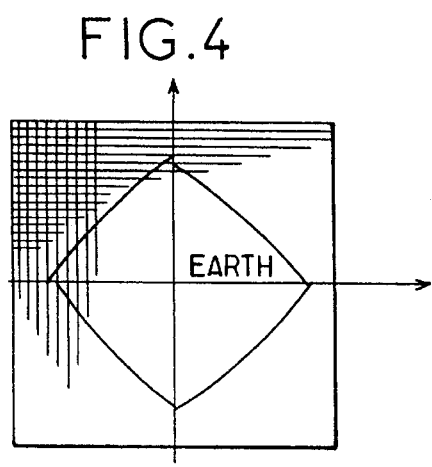
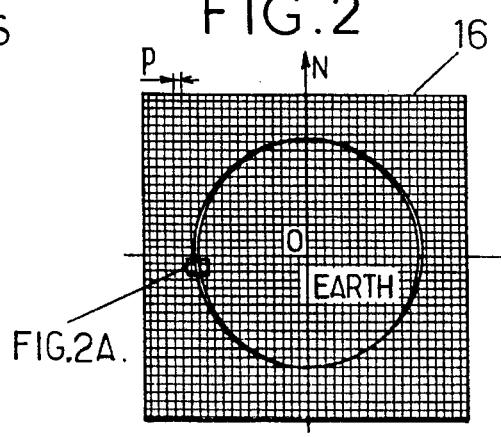
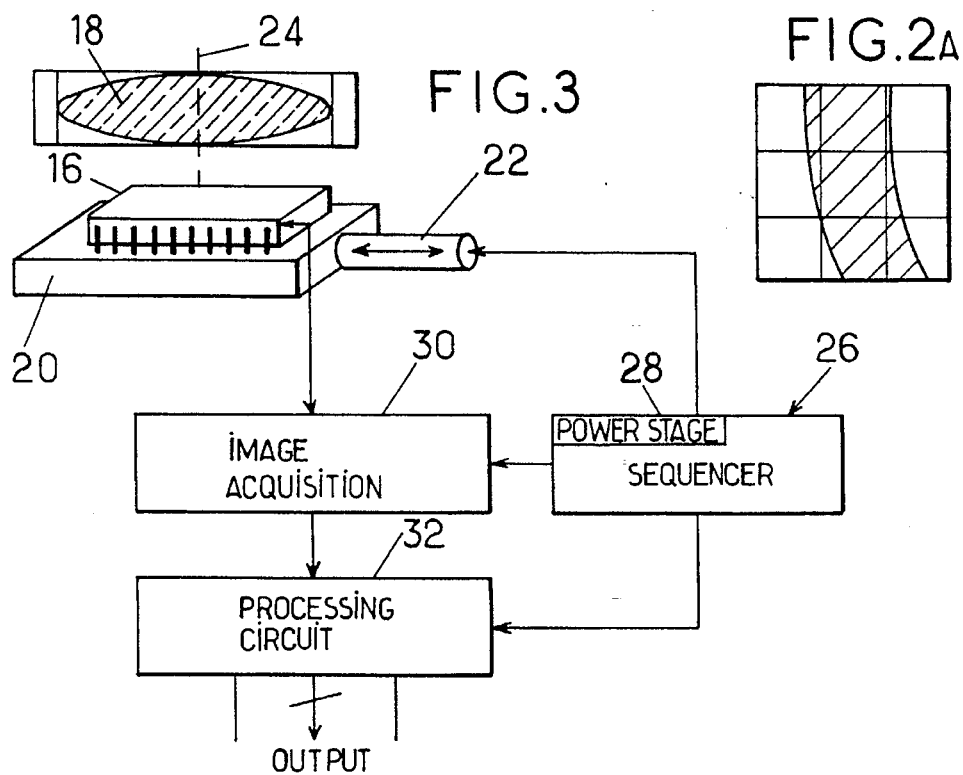

TERRESTRIAL SENSOR DEVICE FOR SATELLITE OR THE LIKE

BACKGROUND OF THE INVENTION

The present invention relates to terrestrial sensor devices intended to be placed on satellites or spacecraft and to aim at the Earth. These devices find a particularly important application in satellite attitude control systems, intended to align the satellite in its entirety, or elements which it carries, with the Earth or a determined region of the Earth. However, they are also usable for other purposes, such as the detection of large-scale fires on Earth.

In an important application, a function of the terrestrial sensor device is to measure position and the orientation of the satellite relative to the centre of the terrestrial disk. It provides information allowing the system to determine the misalignment angles in roll (that is to say along the North-South axis) and in pitch (along the East-West axis) relative to the centre of the Earth.

Currently, terrestrial sensor devices use individual elements, such as bolometers, placed at the focal plane of a lens and they include scanning means making it possible to determine the positions of the space/Earth and Earth/space transitions at a plurality of regions on the terrestrial disk. Most of the presently used devices scan, simultaneously or alternately, bands on either side of the equatorial plane. FIG. 1 shows a possible position of such bands 10a, 10b, 10c and 10d relative to the image 12 of the terrestrial disk, when the satellite is in its intented orientation. Only three of the four transitions a, b, c and d are necessary. The fourth transition provides redundancy and makes it possible to choose the most advantageous set of three bands when the solar position is such that the sun interferes with one of the scans.

One major drawback of these known devices is the requirement for scanning means having a mechanism with moving parts. Such a mechanism is complex and its reliability is limited because it must operate under the extreme conditions encountered in space. Given that detection takes place on single light sensitive elements, the integration time for the infrared light originating from a given point represents only a very small fraction of the measuring cycle.

SUMMARY OF THE INVENTION

It is an object of the present to provide an improved terrestrial sensor device. It is a more specific object to provide such a sensor which does not require scanning.

To this end, the invention provides, in particular, a terrestrial sensor for a satellite, comprising:

lens means for forming an image of the earth in a focal plane, a two-dimensional array of pyroelectric detectors, placed in the focal plane, and means for oscillating the array in its plane at a determined frequency, with an amplitude at least equal to the distribution spacing of the detectors in the array (and typically less than five spacings), means for acquisition of the output signals of the detectors at the said frequency and for comparison of the output signals with a threshold.

The invention uses the availability of sensors constituted by a two-dimensional array of pyroelectric detectors which are sensitive in the infrared range and do not require a device for cooling to a cryogenic temperature. On the other hand, these detectors are sensitive only to temperature variations, with the result that in the imaging systems to which they have been applied hitherto, they are placed behind an optical switch which alternately sends onto them the image of a scene to be observed and the image of a uniform reference scene.

This requirement for a switching mechanism is obviated, in the case of the invention, by giving the array an oscillation which may have a very low amplitude, since this amplitude is of the order of magnitude of the distribution spacing of the detector. Such oscillation may be caused by a deformable element rather than by a movable element. In particular, use may be made of means for oscillating the array in the plane thereof consisting of one or more piezoelectric transducers.

The invention will be better understood on reading the following description of particular embodiments, given by way of examples. The description refers to the accompanying drawings.

BRIEF DESCRIPTION OF THE DRAWINGS

FIG. 1, already mentioned, is an outline diagram showing a conventional mode of detecting misalignment of a geostationary satellite relative to the Earth;

FIG. 2 schematically shows the regions of the detector of a device according to the invention, which provide a signal in the case of oscillation of the detector along a direction parallel to the equatorial plane;

FIG. 2A is a view of a detail of FIG. 2;

FIG. 3 is a block diagram of the means for acquisition of the output signals and for controlling the oscillations;

FIG. 4, similar to FIG. 2, shows the image formed on the detector in the case of a satellite on a low orbit.

DETAILED DESCRIPTION OF A PREFERRED EMBODIMENT

A satellite placed on a geostationnary orbit views the Earth over an angle of approximately 17.5°. Seen from space, the Earth approximately constitutes a black body with a temperature of 300K, whereas the sky background constitutes a black body with a temperature of 4K. When the device uses a sensor 16 constituted by a square array of pyroelectric detectors, an image of the Earth can be formed fully on it by a single lens 18 (FIG. 3) although a set of a plurality of lens or even an optical system having a mirror can be used. In practice, the lens will be designed so that each median of the sensor 16 corresponds to a field of view of approximately 20°×20°, as indicated in FIG. 2. The sensor is placed on a table 20 which an actuator 22, constituting oscillation means, makes it possible to oscillate in its plane, that is to say orthogonally to the axis 24 of the lens, with an amplitude corresponding to at least one distribution spacing p of the pyroelectric detectors of the array. The actuator 22 is advantageously designed to cause an oscillation which is parallel to the plane of the terrestrial equator when the satellite is correctly aligned. In practice, the amplitude of the oscillation will not exceed 5 p. A value of between 1 p and 2.5 p will in general give good results.

The oscillation makes it possible to use the fact that pyroelectric detectors are sensitive only to temperature variations. As a consequence, an output signal will be supplied only by those pyroelectric detectors which are located in the crescent regions in FIG. 2. In the regions close to the poles, each point of the periphery of the terrestrial disk will cause an output signal only on a single pyroelectric detector. In contrast, a plurality of detectors will supply an output signal, of varying value depending on the relative viewing times of the terrestrial disk and of space, for the regions in proximity to the equator. FIG. 2A shows, by way of example, that in a region close to the equator, each point on the periphery of the terrestrial disk gives rise to signals originating from two pyroelectric detectors per line parallel to the equator.

The distribution spacing p of the pyroelectric detectors of the array is such that the required displacements do not exceed a few tens of microns. As a consequence, the actuator 22 may consist of a deformable element containing no mobile components. This deformable element may, in particular, be a stack of pellets of piezoelectric material, which is very simple to employ and require a low amount of electrical energy for actuation. The forces to be exerted are small, since only the sensor and its support need to be moved.

All pyroelectric detectors simultaneously receive the light flux. To allow sequential reading of the information thus acquired, the array of detectors is advantageously coupled to a matrix of charge-coupled elements, or CCDs, with sequential line-by-line reading. Another solution consists in using an output multiplexer.

The sensor is associated with electronics which may be of the type shown in FIG. 3, given by way of example. It includes a sequencer 26 having a power output circuit 28 intended to energize the actuator 22 at a determined frequency and phase. The sequencer 26 also controls image acquisition electronics 30 causing simultaneous reading of the output signals of the various elementary pyroelectric detectors. Finally, a processing circuit 32 has a more or less complex construction depending, in particular, on the desired localization precision.

In a simple embodiment, the circuit 32 compares the output signal corresponding to each pixel, that is to say supplied by each elementary pyroelectric detector, with a threshold and retains only the addresses of the pixels which both:

supply an output signal greater than the threshold, correspond to latitudes within two limit values, for example between 30° and 60°.

On the basis of the values thus retained, the processing circuit 32 may calculate a mean, making it possible to calculate the misalignment angles in roll and pitch using conventional algorithms.

In a more sophisticated embodiment, the addresses and the levels of each of the pixels for which the output signal exceeds a predefined threshold are retained. The values measured for each line of pixels are digitized and processed to determine the locations of the space/Earth and Earth/space transitions, with a resolution which may be less than one pixel. Once all the transition values have been stored, the circuit 32 can determine the centre of the circle for which the standard deviation with the transitions is the lowest.

In the case of a satellite in low orbit, the Earth is seen with an apparent diameter which is too large for the entire image to be projected onto the array. For a conventional terrestrial observation satellite, the angle under which the terrestrial disk is seen may exceed 110°. In this case, the lens 18 may be supplemented by a field splitter, which may be constituted by a reflecting tetrahedron or a set of mirrors, making it possible to project onto the array only arcs of the periphery of the terrestrial disk, typically at latitudes of between 30° and 45°, as shown by FIG. 4.

By way of example, a terrestrial sensor device for a geostationary satellite has been designed by using an array of pyroelectric detectors type TCS THX7441A of the firm—Thomson, France. This array included 128×128 Pyroelectric detectors, distributed with a spacing of 85 μm, the size of each pixel being 81×81 μm. The field of view given by the lens 18 was 20°×20°, which corresponds, for each pixel, to an angular field of 0.157×0.157°. The displacement given by the piezoelectric actuator was of 80 to 200 microns. The acquisition frequency of the image supplied by the array was 10 Hz. The signal was transferred via a reading device formed by a matrix of 512×512 CCD elements.

The processing circuit 32 was designed to identify those pixels supplying a signal exceeding a threshold level and to retain and store, on each line, the address of the space/Earth transition pixel. The circuit performed a mean-value search, making it possible to obtain a precision better than one quarter of a pixel on each line.

On the basis of these data, the misalignment values in roll and in pitch were calculated for chords of the terrestrial disk having a length corresponding to a latitude of between 45° and 55°.

Such processing makes it possible to use a relatively simple processing circuit, not requiring a programmed computer.

I claim:

1. Terrestrial sensor device comprising:

lens means for forming an image of the Earth in a focal plane;

sensor means placed in the said focal plane, comprising a two-dimensional array of pyroelectric detectors having a predetermined distribution spacing; means for oscillating the array in the focal plane, orthogonally to the optical axis of the lens means, at a predetermined frequency and with an amplitude at least equal to said distribution spacing; and means for acquisition of output signals of the detectors at said predetermined frequency and for comparison of the output signals with a threshold.

2. Device according to claim 1, wherein said oscillation means include at least one piezoelectric transducer interposed between a support and the said array.

3. Device according to claim 1, wherein said array is connected to said acquisition circuit means via an integration and charge-coupled device.

4. Device according to claim 1, for use as a terrestrial horizon sensor on a geostationary satellite, wherein said lens means is arranged to form an image of the entire Earth on the array.

5. Device according to claim 1, for use as a terrestrial horizon sensor on a satellite in low orbit, wherein said lens means is arranged to form an image of four regularly distributed arcs of a periphery of the Earth.

6. Device according to claim 1, wherein said oscillation means are arranged to give an amount of oscillation between one distribution spacing and 2.5 distribution spacings of said pyroelectric detectors.

7. Device according to claim 1, wherein said pyroelectric detectors are distributed in said array into a plurality of lines parallel to a direction of said oscillation, further comprising means for detecting and storing locations of space/earth and earth/space transition along at least some of said lines.

8. Device according to claim 7 for use on a satellite, wherein said lines correspond to latitudes of between 30° et 60° on the Earth.

9. Device according to claim 8, wherein said lines correspond to latitudes of between 45° and 55° on the Earth.

10. Device according to claim 7, wherein said detecting means are arranged to store addresses and output levels of each of said detectors for which an output signal exceeds a predefined threshold and to perform interpolation.

* * * * *